United States Patent [19]

Podgorski et al.

[11] Patent Number: 5,548,602
[45] Date of Patent: Aug. 20, 1996

[54] METHOD AND STRUCTURE FOR REFLECTING 633 NM RADIATION WHILE ELIMINATING 650 NM RADIATION IN RING LASER GYRO MIRRORS

[75] Inventors: Theodore J. Podgorski, St. Paul; Rod Thorland, Shoreview; Robert M. Curran, Mendota Heights, all of Minn.

[73] Assignee: Honeywell Inc., Minneapolis, Minn.

[21] Appl. No.: 327,724

[22] Filed: Oct. 24, 1994

Related U.S. Application Data

[63] Continuation of Ser. No. 269,461, Jun. 30, 1994, abandoned.
[51] Int. Cl.⁶ .............................. H01S 3/083; G01B 9/02
[52] U.S. Cl. .................... 372/19; 372/94; 372/99; 356/350
[58] Field of Search ............................ 372/19, 94, 99, 372/92; 356/350

[56] References Cited

U.S. PATENT DOCUMENTS

| | | | |
|---|---|---|---|
| Re. 32,849 | 1/1989 | Wei et al. | 204/198.27 |
| 4,525,028 | 6/1985 | Dorschner | 356/350 |
| 4,627,732 | 12/1986 | Braun et al. | 356/350 |
| 4,900,137 | 2/1990 | Carter | 359/488 |
| 4,904,083 | 2/1990 | Lu et al. | 356/350 |
| 4,968,136 | 11/1990 | Lim et al. | 356/350 |
| 5,166,949 | 11/1992 | Perlmutter | 372/94 |
| 5,416,583 | 5/1995 | Sanzari | 356/350 |
| 5,420,683 | 5/1995 | Hall | 356/350 |

Primary Examiner—Rodney B. Bovernick
Assistant Examiner—Hemang Sunghavi
Attorney, Agent, or Firm—Thomas A. Rendos

[57] ABSTRACT

Apparatus for mode discrimination in laser applications. A laser operating at a wavelength $\lambda c$ may have an undesired mode operating at $\lambda e$. Mirrors are constructed such that the loss induced in the undesired mode by the wavelength centering of at least one of the mirrors exceeds the available gain of the laser.

8 Claims, 6 Drawing Sheets

METHOD AND STRUCTURE FOR REFLECTING 633 NM RADIATION WHILE ELIMINATING 650 NM RADIATION IN RING LASER GYRO MIRRORS

This application is a continuation of application Ser. No. 08/269,461 filed Jun. 30, 1994, now abandoned.

BACKGROUND OF THE INVENTION

This invention is related to mirrors, and more specifically, to mirrors used in laser applications.

In the following drawings, similar reference numbers are used to show similar features. FIG. 1 shows a simplified view of a prior art ring laser gyro (rlg) 10. The rlg includes a block 15, bores 30A–C located within the block 15 output mirror 20, transducer mirrors 25 A and B, and electrodes 35 A–C. Located within the bores, but not shown, is a gain medium such as a combination of helium and neon gasses. When the gas is electrically charged via electrodes 35A–C, two primary laser signals are formed. One propagated in a clockwise direction around the path formed by the bores, the other propagated in the opposite direction. In the case of helium neon gas, a laser signal operating at a wavelength of 633 nm is the preferred mode of operation.

The output mirror 20 has a lower reflectivity than the transducer mirrors 25A and B to allow some light to pass through the mirror. Readout optics and electronics can be arranged in communication with the output mirror 20 in a well known way to produce a signal representative of the rotation rate of the rlg.

The transducer mirrors 25A and B have high reflectivities, on the order of 99.996%, to ensure propagation of the laser signals. The transducer mirrors are so named since they sit on transducers for adjusting the path length of the laser signals. This so called path length control is well known in the art.

High-reflectance mirrors, such as those used in ring laser gyros, are structures consisting of a series of periodically varying refractive index layers in a direction perpendicular to the mirror surface. Examples of such structures are shown in prior art FIGS. 2–5.

In FIGS. 2 and 3 a prior art output mirror 20 is shown. The mirror 20 is constructed of a stack of alternating layers of high and low index of refraction materials, each layer having an optical thickness equal to a quarter wavelength ($\lambda/4$) of the primary wavelength of light (mode) of the laser. Optical thickness is calculated by determining the path length through the layer along the path by which the laser signal propagates through the layer times the index of refraction. Layers 305A–305M may be a high index of refraction material such as titanium dioxide ($TiO_2$). Layers 310A–310M may be a low index of refraction material such as silicon dioxide ($SiO_2$). Substrate 330 is formed from a material having a desired coefficient of thermal expansion such as Zerodur or BK-7, materials which are well known in the art. Apparatus and methods of producing such mirrors are disclosed in U.S. Pat. Nos. 5,216,330 issued on Jun 1, 1993 to Ahonen, 5,240,583 issued on Aug. 31, 1993 to Ahonen and 5,308,461 issued on May 3, 1994 to Ahonen, all of which are commonly owned with the present application and are incorporated herein by reference.

Referring now to prior an FIGS. 4 and 5 there shown is a prior art transducer mirror 25. The transducer mirror may be identical to the output mirror 20 in all respects including thickness, except that the transducer mirrors included more layers to accomplish the desired higher reflectivity.

While the rlg operates on a selected primary mode, additional modes of operation may also be present, such as signals operating at a wavelength of 650 nm, which is P-polarized These additional signals add noise to the signal produced by rotation of an operating rlg. Thus, there have been attempts to eliminate the 650 nm signal. U.S. Pat. No. 4,627,732 (Braun et al.) issued on Dec. 9, 1986 and 4,519,708 (Perimutter et al.) issued May 28, 1985 are both directed toward attempted solutions to the suppression of unwanted modes of laser operation.

In Braun et al., a mirror is treated with an electron beam which induces a change in the physical structure of the mirror. This in turn causes a phase change to occur to undesired signals thereby destroying propagation of the unwanted signal.

In Perimutter et al., a rlg mirror is modified by deposition of a light absorptive material on the surface of the mirror. The absorptive material absorbs some of the energy of the undesired signal thereby preventing further propagation.

SUMMARY OF THE INVENTION

The present invention is a ring laser gyro operating at a principal wavelength of $\lambda c$ which includes mode control apparatus for eliminating light of the wavelength $\lambda d$. The ring laser gyro includes a block having at least three bores in communication with each other. Mirrors are located at the intersection of the bores. At least one of the mirrors is an output mirror which allows some light to pass there through. The output mirror is constructed of layers having an optical thickness of $(X\lambda c)/4$ where X is an integer. At least one of the mirrors is constructed with layers having an optical thickness of $\lambda e/4$ where $\lambda e$ is chosen so as to create a loss greater than Z parts per million in the $\lambda d$ light without greatly affecting the loss of the $\lambda c$ light. Z is equal to the gain possible from using a rlg configuration with a selected gain.

DESCRIPTION OF THE PREFERRED EMBODIMENT

Figure 1:
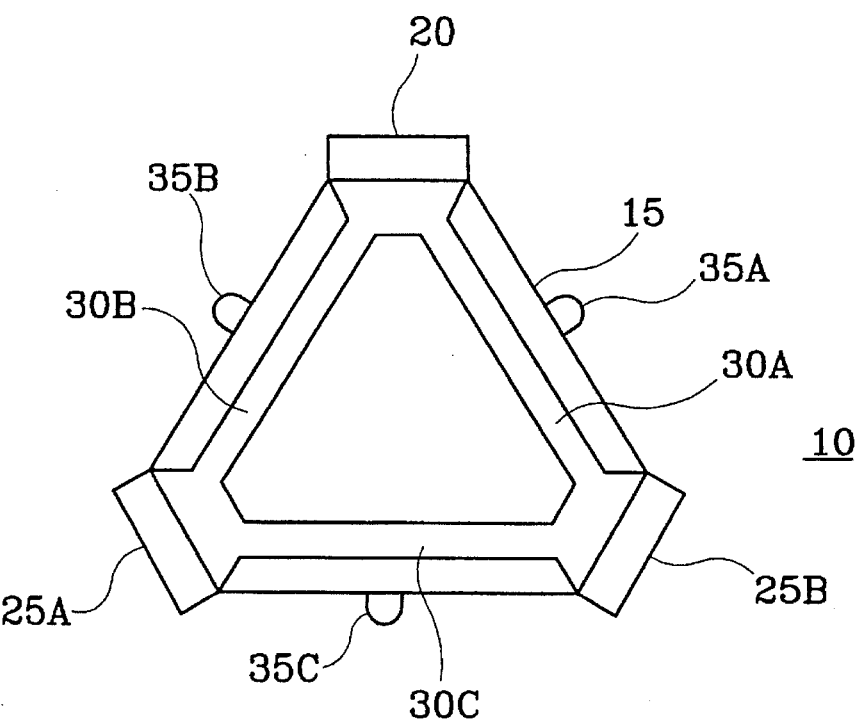
FIG. 1 shows a prior art ring laser gyro.
Figure 2:
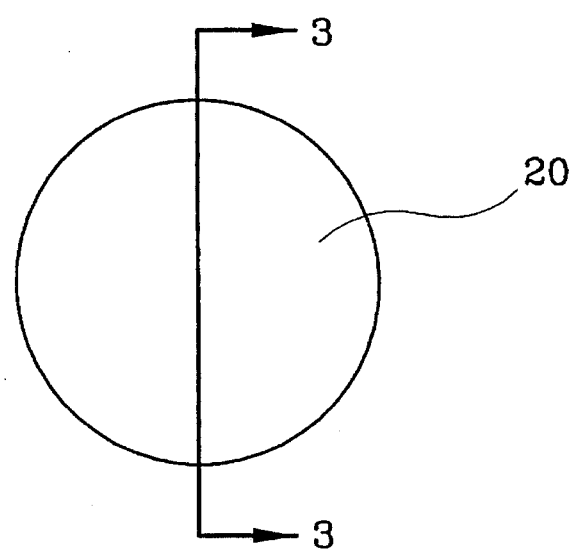
FIGS. 2–3 show prior an output mirrors.
Figure 3:
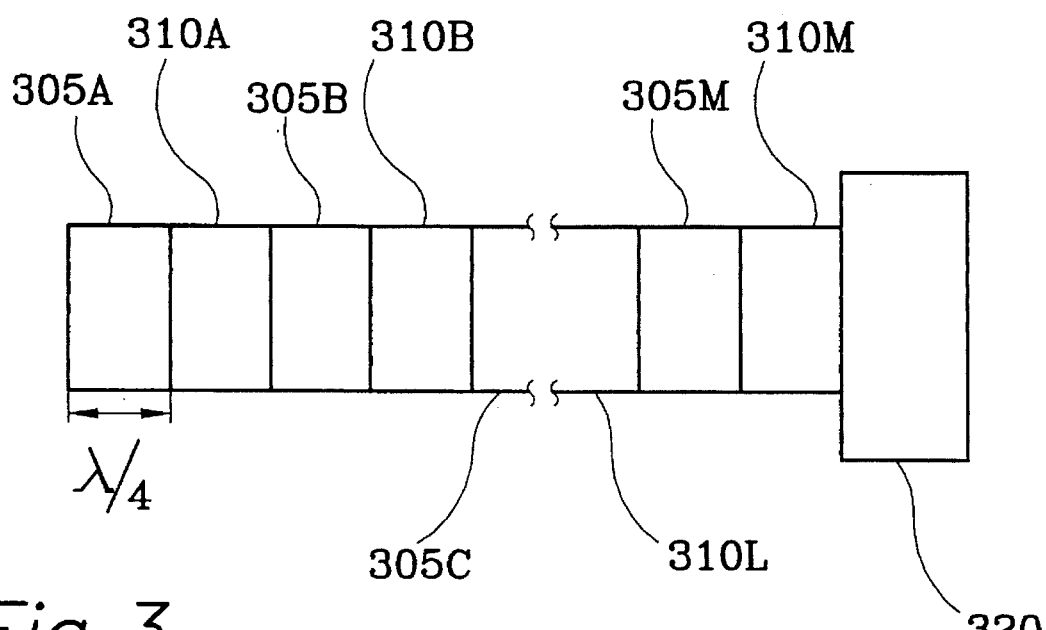
Figure 4:
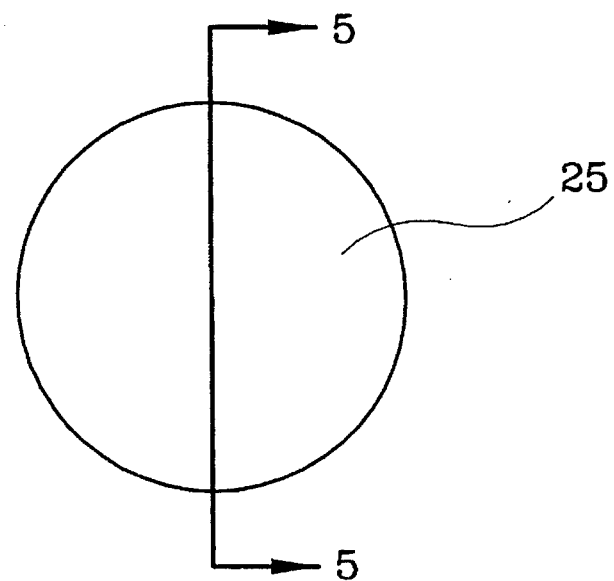
FIGS. 4–5 show prior an transducer mirrors
Figure 5:
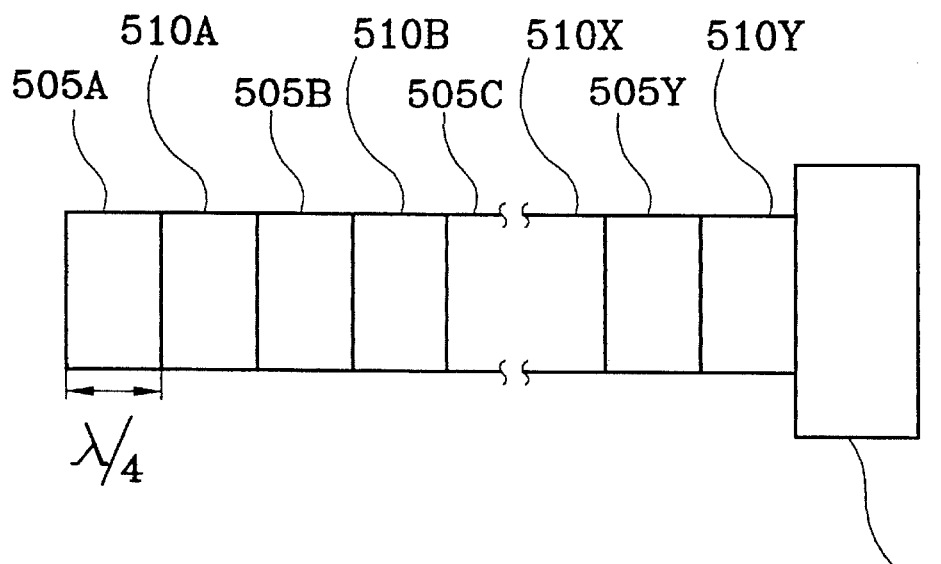
Figure 6:
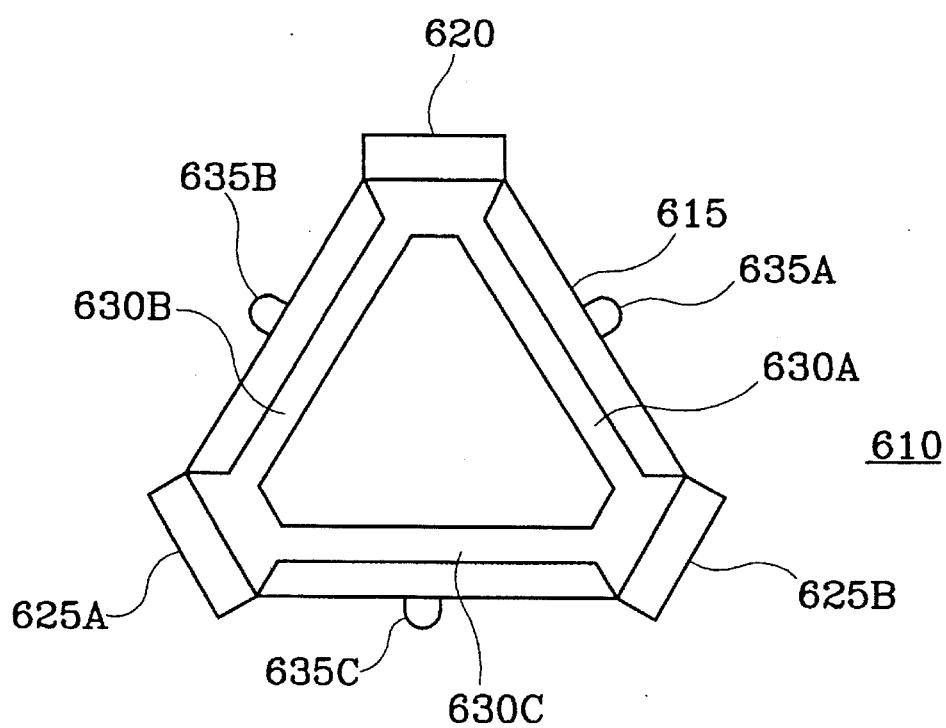
FIG. 6 shows a preferred embodiment of the present invention.

Referring now to FIG. 6, there shown is a preferred embodiment of the presently inventive rlg 610. RLG 610 includes body 615, bores 630 A–C formed in the body, output mirror 620, transducer mirrors 625A–B and electrodes 635A–C. A gain medium (not shown) is placed in the bores and electrically charged through the electrodes 635A–C as described before to produce two counter propagating laser signals.

Figure 7:
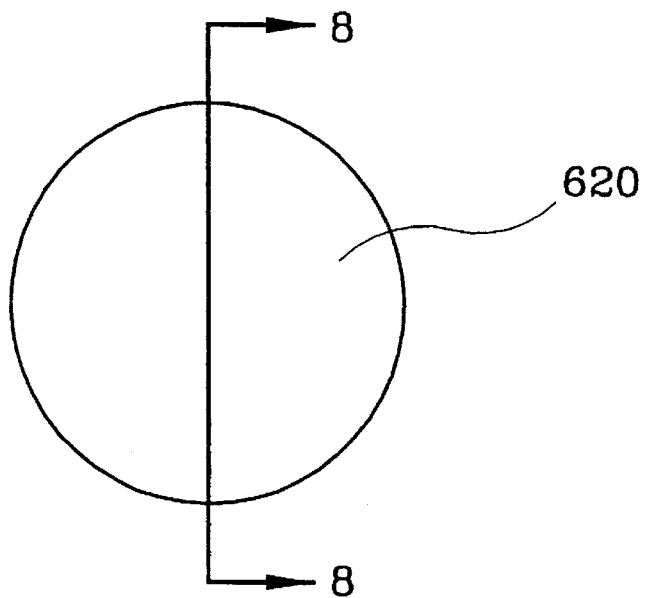
FIGS. 7–8 show an output mirror of the present invention.
Figure 8:
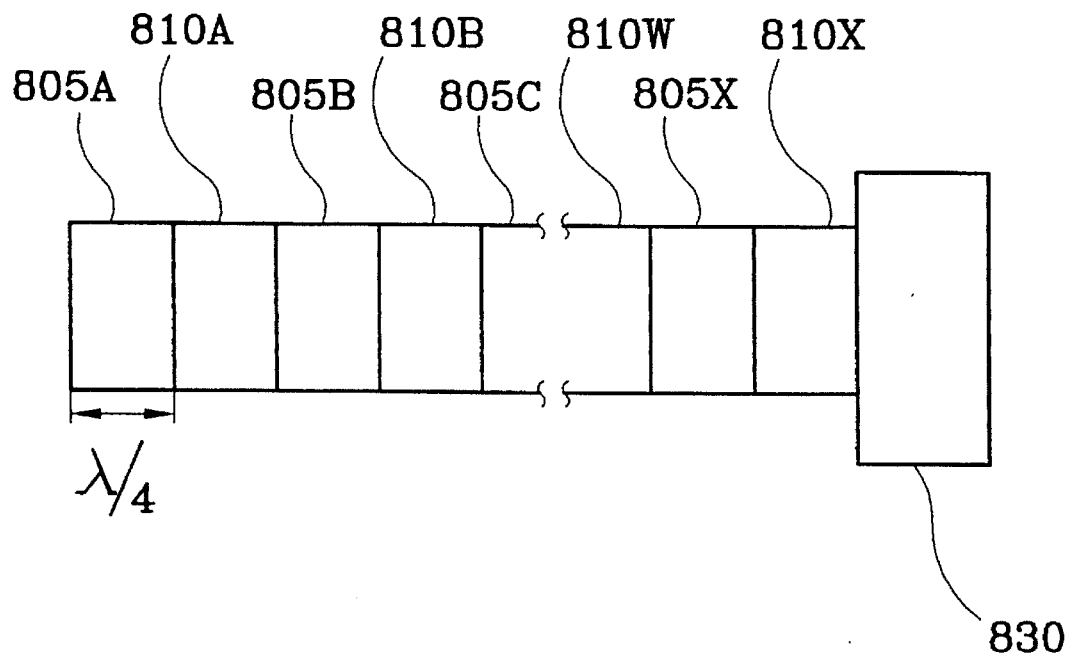

The output mirror 620 is further described with reference to FIGS. 7 and 8. The output mirror 620 may be made using the prior an methods of making mirrors. Each layer 805A to 805X and 810A to 810X is constructed to have an optical thickness of $(K_m \lambda c)/4$, where K is an integer and m=1 to X (the number of layers). K is most commonly equal to 1.

Figure 9:
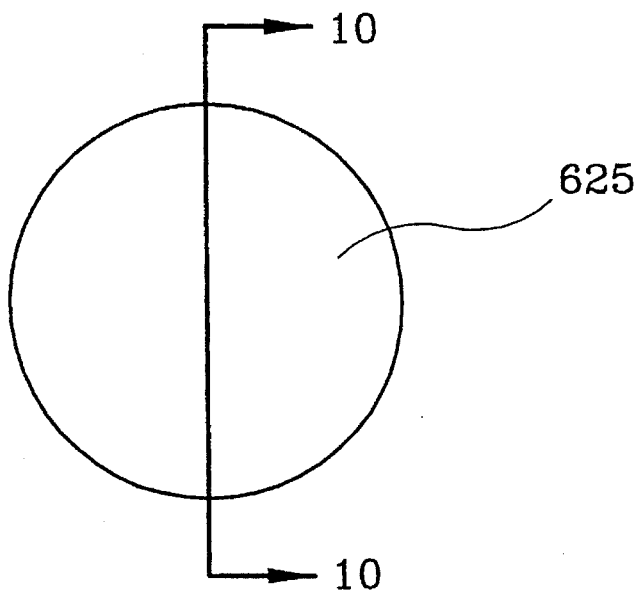
FIGS. 9–10 show a transducer mirror of the present invention.
Figure 10:
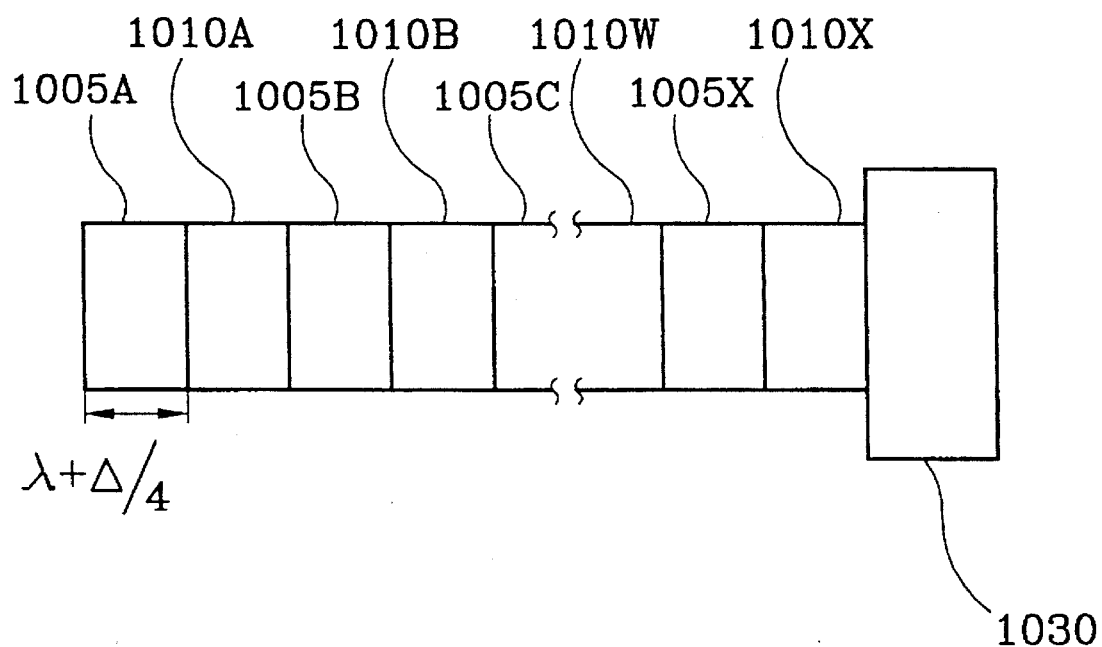

A major difference between the present invention and the prior art lies in at least one of the transducer mirrors 625 of the present invention as depicted by FIGS. 9 and 10. The transducer mirror or mirrors is/are comprised of layers 1005A to 1005X and 1010A to 1010X having an optical thickness $(J_n \lambda e)/4$ where J is an integer and n=1 to X (the number of layers).

In one preferred embodiment, X is equal to 24, $\lambda c$=633 nm (desired mode of operation), $\alpha d$=650 nm (undesirable mode of operation), $\lambda e$=560 nm and J and K for all m and n equals 1. If the gain medium is helium neon and the electrical current through the electrodes is set to 1.5 mA, the possible gain is then equal to 1200. With the mirrors chosen as described in this paragraph, losses, in parts per million-(ppm) are as follows:

TABLE 1

| WAVE-LENGTH | TRANSMISIVE | ABSORPTION + SCATTER | TOTAL |
| --- | --- | --- | --- |
| 633 | 81 | 200 | 281 |
| 650 | 1080 | 200 | 1280 |

The method of calculating these losses is well known in the art.

As can be seen from the above table, losses in the 650 nm wavelength exceed available gain. Accordingly, light will not be able to propagate at this wavelength.

A benefit of the present invention is that the mode discrimination portion of transducer mirrors may be made with less process steps than the prior art mirrors. No masking of mirror portions is necessary in the inventive process.

Figure 11:
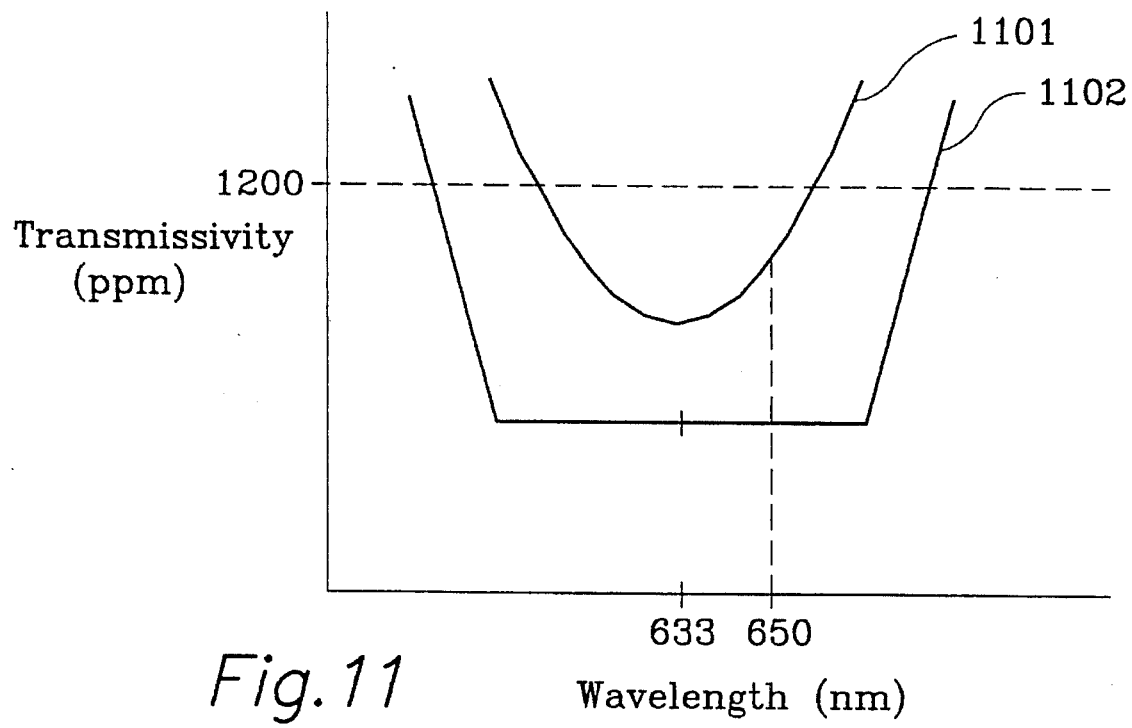
FIGS. 11–12 show plots of transmissivity vs. wavelength for two preferred mirrors.
Figure 12:
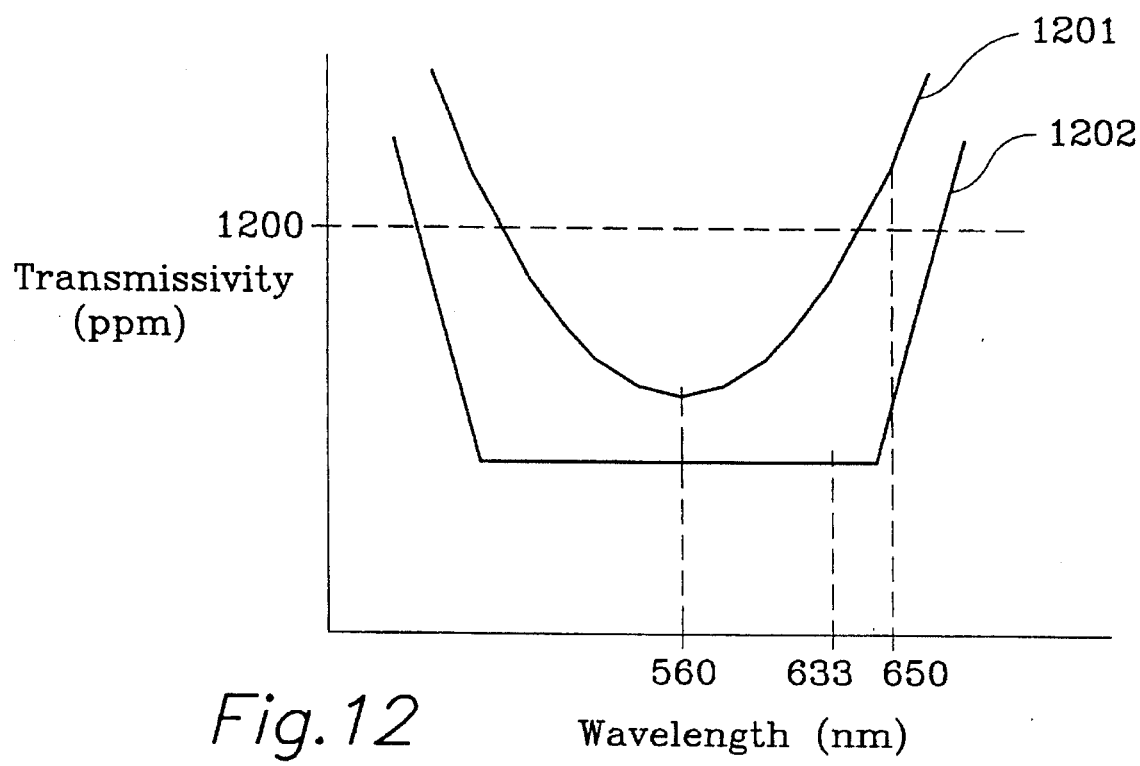

Referring now to FIGS. 11 and 12, there shown are plots of transmissivity vs. wavelength for mirrors which are wavelength centered at 633 and 560 nm respectively. Curves 1101 and 1201 represent the transmissivity of P-polarized light vs. wavelength while curves 1102 and 1202 represent the transmissivity of S-polarized light vs. wavelength.

In FIG. 11, the curves are representative of a mirror which is wavelength centered at 633 nm. Note that for both the 633, S-polarized signal and the 650, P-polarized signal, the transmissivity of this mirror is less than 1200, the available gain. Therefore, the 650 P-polarized light will not be adversely affected by this mirror itself.

In FIG. 12, the curves are representative of a mirror which is wavelength centered at 560 nm. Here, while the transmissivity of the 633 S-polarized signal is still at a minima, the 650 P-polarized signal suffers a loss greater than the available gain. Accordingly, the 650 P-polarized signal will not be propagated in this situation.

It is important to note that there is a range of values at which the transducer mirror may be wavelength centered. In the present example, wavelength centering could occur between 565–555 nm with approximately the same results.

The foregoing has been a description of a novel and non-obvious ring laser gyro which includes mode discrimination. The inventor intends that the foregoing description be viewed as explanatory and does not intend the description to be limiting. Instead, he defines the scope of his invention by the claims appended hereto.

We claim:

1. In a ring laser gyro which produces a gain for first and second counter propagating signals having a wavelength of $\lambda c$ and a signal having a wavelength of $\lambda d$, a mode discrimination apparatus, comprising:

a first mirror comprised of alternating layers of materials having high and low indices of refraction respectively, each layer having an optical thickness proportional to $\lambda c/4$; and second and third mirrors comprised of alternating layers of materials having high and low indices of refraction respectively, each layer of said second mirror having an optical thickness proportional to $\lambda e/4$, wherein $\lambda e$ is a wavelength chosen to create loss in the $\lambda d$ signal which is greater than the gain.

2. The apparatus of claim 1, wherein:

said $\lambda c$ signal has a loss less than the gain due to the choice of $\lambda e$.

3. The ring laser gyro of claim 1, wherein:

$\lambda c$=633 nm, $\lambda d$=650 nm and $\lambda e$=560 nm.

4. The ring laser gyro of claim 1, wherein:

said 633 nm signal is S polarized while said 650 nm signal is P polarized.

5. In a ring laser gyro which when energized creates a pair of counter-propagating signals in a gain medium, the counter-propagating signals having a wavelength of $\lambda c$ and an undesired signal having a wavelength of $\lambda d$, the gain medium having a gain of X, a mode discrimination apparatus, comprising:

a first mirror wavelength centered at $\lambda c$;

second and third mirrors wherein said second mirror is wavelength centered at $\lambda e$, where $\lambda e$ is chosen so that the transmissivities of said first, second and third mirrors for said undesired signal are greater than X.

6. The apparatus of claim 5, wherein:

said $\lambda c$ signal has a loss less than the gain due to the choice of $\lambda e$.

7. The appring laser gyro of claim 5, wherein:

$\lambda c$=633 nm, $\lambda d$=650 nm and $\lambda e$=560 nm.

8. The ring laser gyro of claim 5, wherein:

said 633 nm signal is S polarized while said 650 nm signal is P polarized.

* * * * *